S. M. DICK.
DEHYDRATED MILK AND PROCESS OF PRODUCING SAME.
APPLICATION FILED JAN. 31, 1920.

1,374,555.

Patented Apr. 12, 1921.
2 SHEETS—SHEET 2.

INVENTOR
SAMUEL M. DICK
By Paul & Paul
HIS ATTORNEYS

UNITED STATES PATENT OFFICE.

SAMUEL M. DICK, OF MINNEAPOLIS, MINNESOTA, ASSIGNOR TO INTERNATIONAL DRY MILK COMPANY, OF MINNEAPOLIS, MINNESOTA, A CORPORATION OF DELAWARE.

DEHYDRATED MILK AND PROCESS OF PRODUCING SAME.

1,374,555.   Specification of Letters Patent.   Patented Apr. 12, 1921.

Application filed January 31, 1920. Serial No. 355,358.

*To all whom it may concern:*

Be it known that I, SAMUEL M. DICK, a citizen of the United States, resident of Minneapolis, in the county of Hennepin and State of Minnesota, have invented certain new and useful Improvements in Dehydrated Milk and Processes of Producing Same, of which the following is a specification.

This invention relates to improvements in dehydrated milk, and in a process of producing the same, one object I have in view being to produce from whole milk, or milk containing a standardized percentage of butter fat, a dry powder, possessing superior keeping qualities, and which, by the addition of water alone, will produce milk corresponding to normal milk, on which cream will rise that may be skimmed off and used in the same way as cream from natural milk.

Another object of the invention is to provide a whole milk powder in which the butter fat globules have not been destroyed or materially injured in the process of dehydration, whereby when the milk has been restored by the addition of water, cream will rise normally from the product, usually requiring twelve to fifteen hours for the butter fat globules to rise to the top, on any given quantity of milk made from the powder.

Another object of the invention is to provide a milk powder in which the butter fat globules in their natural condition are enveloped or encysted in a sack or membrane formed of the colloidal substances of the milk, such as the casein and albumin, this sack or membrane being impenetrable by bacteria and greatly resisting atmospheric and climatic influences, whereby the colloidal substances in the milk are utilized as a preservative to prevent decomposition of the fatty substances of the powder. This is a matter of great importance inasmuch as milk normally contains 3.5 butter fat, while a powder produced by my process contains about 28 per cent. butter fat.

Other objects of the invention will appear from the following description and claims.

Figure 1:
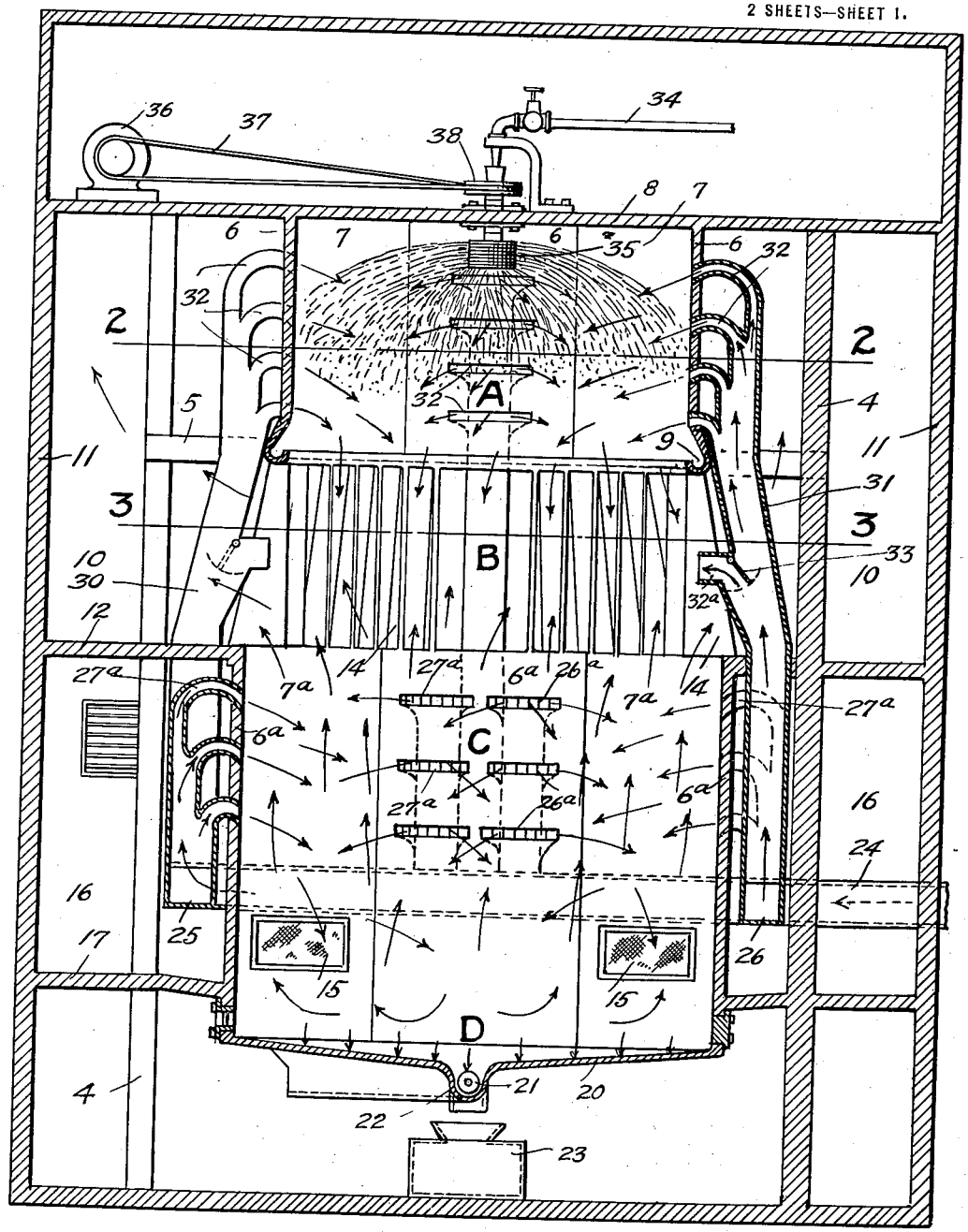
Figure 2:
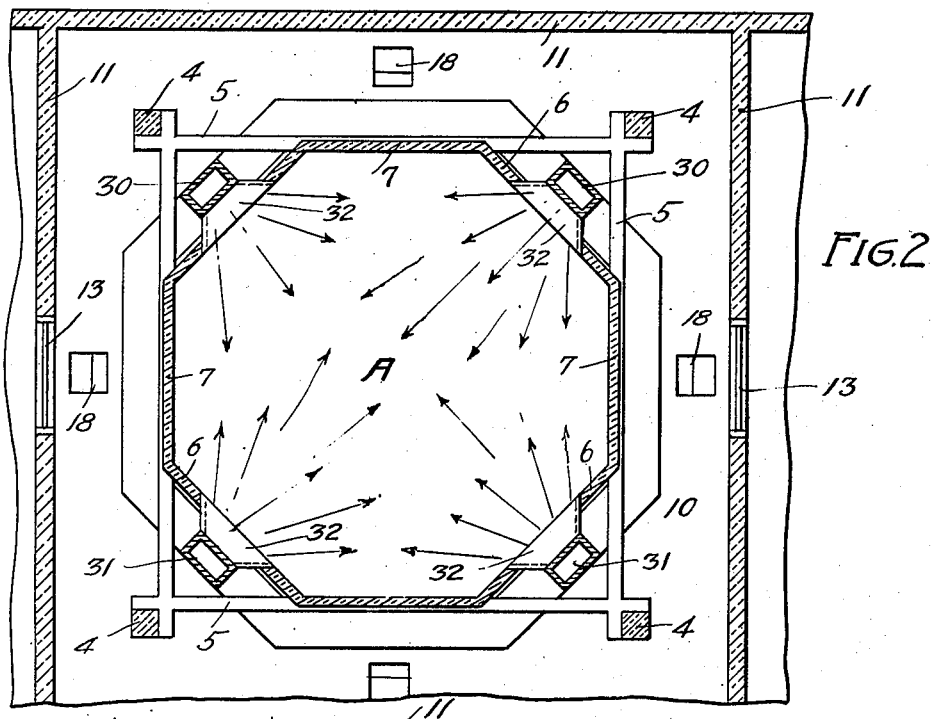
Figure 3:
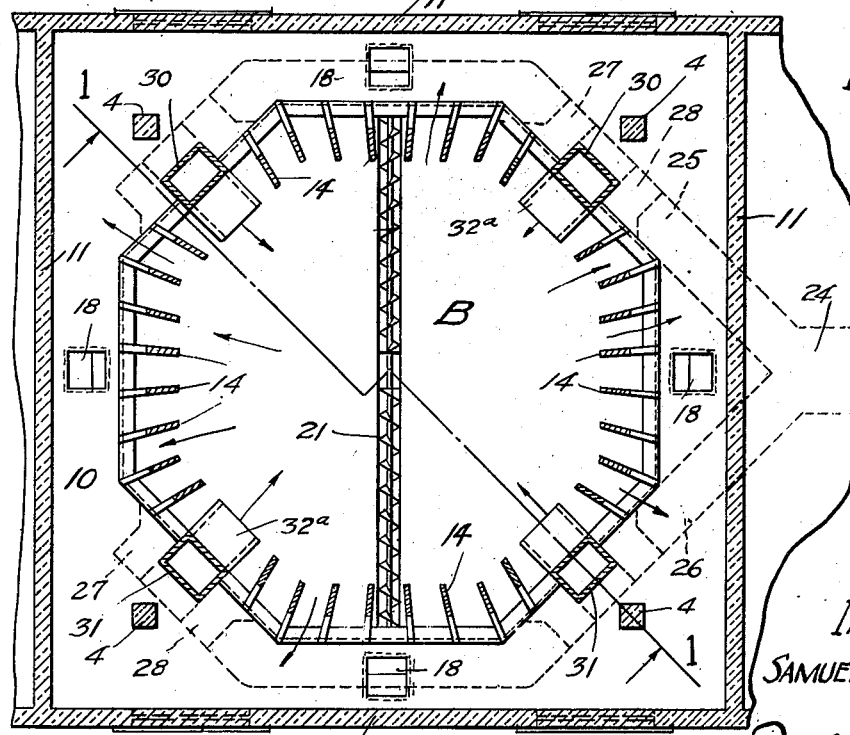

In the accompanying drawings which form a part of this specification, I have illustrated a dehydrating cell or chamber that may be employed for carrying out my improved process. In these drawings, Figure 1 is a vertical section of a dehydrating cell, the section being taken on line 1—1 of Fig. 3, Fig. 2 is a horizontal section on line 2—2 of Fig. 1, Fig. 3 is a horizontal section on line 3—3 of Fig. 1.

The cell illustrated in the accompanying drawings is of octagonal form in horizontal cross section, although the process may be carried out in a cell that is circular, rectangular or of other form in cross section. As here shown this cell is divided into four superimposed connecting zones, comprising in consecutive order, beginning at the top of the cell, an upper mixing and evaporating zone A, an exhaust or dead air zone B, a dehydrating or finishing zone C, and a collecting or receiving zone D. The upper zone A is supported upon vertical posts 4, preferably by means of cross girders 5, and is inclosed by the octagonally arranged vertical walls 6 and 7, and a ceiling or upper floor 8. This zone opens downward directly into the exhaust zone B. Around the lower outer portion of the zone A I prefer to arrange a trough 9.

The exhaust or dead air zone B is arranged between the upper evaporating zone A, and the dehydrating finishing zone C, and communicates directly with both of these zones. Surrounding the upper portion of the cell comprising the zones A and B is an air space or chamber 10 inclosed by an exterior wall or walls 11, the ceiling or upper floor 8, which extends over such chamber, and a floor 12. The chamber 10 connects the exhaust zone B with the outer air through louvers 13, (see Fig. 2), and this chamber is preferably of considerable area or capacity so that air from the cell may move slowly and without appreciable currents through it to the outer air.

The dead air or exhaust zone B of the cell may be directly open to the chamber 10, without any form of inclosure, or may be inclosed in various skeleton forms, or with various materials through which air will freely pass. I prefer, however, to arrange a series of deflecting plates 14, radially around the center of the zone, supporting these plates in any suitable manner.

The zone C is preferably of greater diameter than the upper zone A, and the deflecting plates 14, arranged between the zones A and C, are preferably provided with the vertical inner edges and the sloping outer edges, as shown in Fig. 1 of the drawings. The plates 14 may also serve for the skeleton frame around and upon which suitable cloth may be mounted to partially or entirely inclose the dead air zone.

The zone C is inclosed by walls 6$^a$ and 7$^a$, in the lower part of which I preferably provide exhaust ports 15 preferably covered with cloth through which air from this zone may have exit into a surrounding chamber 16, inclosed by the walls 11, and floors 12 and 17. Suitable trap doors 18 may be provided in the floor 12 through which air may pass from the chamber 16 into the upper chamber 10 and thence escape to the outer air through the louvers 13.

The lower or collecting zone D consists substantially of the space inclosed by the walls 6$^a$ and 7$^a$ below the exhaust ports 16 and terminates at the floor 20, which forms the bottom closure of the cell. This floor preferably slants downward from the sides toward the center, where I preferably arrange a spiral conveyer 21 in a trough 22, adapted to discharge the finished material into a suitable reservoir 23.

Air is supplied to the cell from a fan or blower (not shown in the drawing) preferably through an air trunk 24 having main supply branch pipes 25 and 26, partially passing around the cell at the lower portion of the finishing zone C. From these branch pipes lead upward a series of pipes 27 and 28, preferably arranged in four pairs and terminating with inwardly curved nozzles 26$^a$ and 27$^a$, passing through the walls 6$^a$ to the zone C of the cell. I prefer to provide each vertical branch pipe with three nozzles, spaced one above the other, at varying distances, and arranged with each tier of nozzles directly opposite another series extending through the opening through the walls of the cell. Between the members 27 and 28 at each pair of branch pipes, I preferably arrange vertical pipes 30 and 31, passing from the main supply pipes 25 and 26, and terminating above with the inwardly curved nozzles 32, leading to the upper evaporating or mixing zone A of the cell. I have shown a series of four nozzles, laid one above the other for each pipe 30 and 31 and these preferably enter the cell at opposite sides of the zone through the cell walls 6. Intermediate the zones A and C, and in the dead air line space of the exhaust zone B, I preferably provide an air duct 32 controlled by a valve 33 leading inwardly from the vertical air pipes 30 and 31, through which any light current of air may be directed into the dead air space of the exhaust zone.

The air is heated preferably before it enters the conductors here shown, to any desired temperature.

The milk is delivered from a supply pipe 34 into the upper zone A of the cell in a series of thin sheets or sprays produced by a centrifugal sprayer 35 mounted usually below the ceiling 8 at substantially the center of the cell and driven by any suitable means such as a motor 36, belt 37, and pulley 38.

The heated air is admitted to this room through the nozzles 32 and immediately mixes with the spray or finely divided particles of milk distributed equally over the whole area of the cell, but carried by gravity toward the bottom thereof. The even mixture of the heated air with the atomized liquid causes a partially instantaneous evaporation and the air takes up the maximum amount of moisture. The mixture-laden air and milk constituents gravitate toward the exhaust or dead air zone B there being no other exit from the zone A. Simultaneously with the admission of air to the zone A, air is admitted to the finishing zone C through the nozzles 26$^a$ and 27$^a$ with a great variety of curves and directions and at different velocities. This volume of air naturally rises to the exhaust and dead air zone B where it meets the falling volume of air from the upper or evaporating zone A, resulting in a dead air line or equilibrium across the vertical center of the exhaust zone B. The air from both zones A and C drifts out through the chamber 10.

In the dehydration of milk for the purpose of obtaining the constituents thereof, in the form of a dry powder, it has been customary to spray the milk into a dehydrating cell or chamber by means of an atomizer operated by the pressure of steam or heated air. One of the consequences of this operation has been to break up and crush the globules of butter fat so that, in the resulting milk powder, these globules of butter fat are in a finely divided and desiccated condition. With the butter fat in this condition, finely divided and intimately mixed with the casein and albumin of the milk, it has been found difficult to produce a milk powder having keeping qualities, as the oxygen of the air acting upon the minute particles of butter fat soon causes the powder to become rancid.

In carrying out my invention I avoid applying pressure to the milk at any stage of the operation.

I may employ any suitable dehydrating cell or chamber. I prefer the cell shown in the accompanying drawings, but may use that illustrated and described in the accompanying drawings, although I do not limit myself to the use of any particular cell.

Into the upper end of a dehydrating cell I spray the milk to be dehydrated in such manner as not to apply pressure thereto, whereby the milk enters the dehydrating cell in normal condition without the globules of butter fat being compressed, injured or destroyed.

Any suitable means may be used for spraying milk into the dehydrating cell. I have used, with excellent results, the centrifugal atomizer disclosed in my pending application for patent filed December 8th, 1919, Serial No. 343,415. With this atomizer the milk is spread into thin films on disks over which it feeds outwardly toward the peripheral edges by centrifugal force. By thus reducing the milk to a film before it is discharged into the dehydrating cell, it comes into intimate contact with the air in the dehydrating cell, so that maximum dehydrating efficiency is obtained from such air.

Feeding the milk into the dehydrating cell in this manner, without pressure, leaves the butter fat globules in their normal or uninjured condition.

For the purpose of dehydrating the milk I prefer to use in the dehydrating cell heated air currents moving in compound circles. These may be produced in any suitable way and by any suitable means but I prefer to employ the means shown in the accompanying drawings. I have used with good results the means disclosed in the accompanying drawings, in which the air currents are brought into the cell at various angles from the sides of the cell, whereby the air currents from the different nozzles mingling in the cell produce a rolling or cyclonic action, which is imparted to the atomized milk, causing the solid and colloidal constituents thereof to be rolled around in the cell, while the water of the milk is vaporized and passes out from the cell. The result of this action is that the globules of butter fat remain in their original condition and the rolling action of the air currents causes the colloidal constituents of the milk such as the casein, albumin, etc., to form an envelop around each of said butter fat globules. The globules thereby become encysted or coated by the colloidal constituents of the milk and are in this manner protected from the action of bacteria and from deleterious oxidation.

I prefer to employ in the dehydrating cell currents of air heated to about 160 degrees Fahrenheit, although I have used air heated as high as 168 degrees, or as low as 150 degrees with fairly satisfactory results. I have obtained the best results, however, by using air currents of substantially 160 degrees Fahrenheit.

This is a low temperature compared with the temperatures generally employed for dehydrating skimmed milk.

Encysting the butter fat globules with the casein at this low temperature does not destroy emulsifying qualities of the casein, so that when it is desired to use the powder, and it is placed in water, the casein particles melt off from the butter fat globules and become suspended in the solution the same as they are originally in natural milk.

The milk powder thus produced contains all the constituents of the natural milk with the water removed, and the milk powder thus produced possesses, therefore, very superior keeping qualities.

Moreover, by adding water to the milk powder, in the proper proportion a product corresponding in all particulars to natural or normal milk is produced.

From the milk so produced the cream will rise in the natural way and in about the usual time. This cream possesses the qualities and characteristics of normal cream and the remaining skimmed milk also possesses the usual qualities and characteristics of such milk.

In carrying out this process the milk in the dehydrating cell is exposed to the heated air only while it is passing downward through the cell. Its course will be retarded by the rolling action of the compressed air currents.

I prefer to remove the resulting dry powder from the dehydrating chamber immediately after it is produced by means of cold air currents or other suitable means.

In operating my new process only about five minutes' time is required from the starting of the raw milk in the dehydrating apparatus until the milk powder is dry and cool enough to pack for commercial purposes.

I may reduce the milk to a dry powdered form in a single cell, or I may employ two cells arranged side by side as shown in my said application No. 337,581, pumping the partly reduced milk removed from the bottom of the first cell to the top of the second cell. By using two cells I may employ a structure of about one-half the height that would be required if the entire process were carried out in a single cell.

The resulting powder has the following characteristics: (1) It contains all the butter fat globules of the milk practically uninjured; (2) cream rises normally on milk made from the powder; (3) this cream can be separated from the milk with any ordinary commercial separator, or it may be skimmed off after the practice of the housewife; (4) the cream can be churned and produce butter of a commercial quality; (5) the skimmed milk after separation may be made into cottage cheese or used for any purpose for which ordinary skimmed milk may be employed.

It is found, in the production of a dry powder by this process, that during dehydration the colloidal substance of the skimmed solids in the milk are caused to envelop or encyst the fat globules, thus rendering them impervious to bacteria, making them far less liable to atmospheric or climatic influences, and thus producing a keeping quality not possessed by other milk powders containing fatty substances.

Valuable features of the process are found in the fact that the total exposure of the milk in the dehydrating cell constitutes only a few seconds of time; dehydration is carried on at comparatively low temperatures; the heated air currents are moved in compound cycles; the powder is removed by cold air currents and is chilled or cooled as fast as it is made, and is then ready for packing.

I claim as my invention:

1. The process of producing a dry powder from whole milk consisting in atomizing milk without pressure in a suitable dehydrating cell, subjecting the atomized milk to the action of compound currents of heated air, thereby dehydrating the milk without breaking or injuring the globules of butter fat, and simultaneously coating or encysting said butter fat globules with casein, albumin and other colloidal constituents of the milk.

2. The process of producing a dry powder from whole milk consisting in atomizing the milk, without pressure, in a suitable dehydrating cell, subjecting the atomized milk in said cell to the action of compound currents of heated air, thereby dehydrating the milk without breaking or injuring the globules of butter fat, and coating or encysting the butter fat globules with the colloidal constituents of the milk.

3. The process of producing a dry powder from whole milk consisting in atomizing the milk in a suitable dehydrating cell, subjecting the atomized milk in said cell to the action of compound currents of heated air, thereby dehydrating the milk without injuring the globules of butter fat, and coating or encysting said butter fat globules with the colloidal constituents of the milk.

4. The process of producing a dry powder from whole milk consisting in atomizing the milk without pressure, subjecting the atomized milk in a suitable cell to the action of compound currents of heated air and coating or encysting the butter fat globules with the colloidal constituents of the milk.

5. The process of producing a dry powder from whole milk consisting in atomizing the milk without pressure, subjecting the atomized milk in a suitable cell, to the action of compound currents of heated air and simultaneously coating or encysting the butter fat globules with the colloidal constituents of the milk.

6. The process of producing a dry powder from whole milk, consisting in atomizing the milk without pressure by distributing it in a thin film in a suitable dehydrating cell, subjecting said atomized milk to compound currents of heated air and thereby dehydrating the milk while leaving the butter fat globules in an unbroken or normal condition, and encysting the same with the casein, albumin and other colloidal constituents of the milk.

7. A whole milk powder comprising butter fat globules in substantially unbroken or normal condition, with coating around said globules formed of casein, albumin and other colloidal constituents of normal milk, such casein or other constituents being capable of ready solution, on the addition of a requisite quantity of water, to produce a liquid substantially the same as normal milk and on which the cream will rise as on such milk.

8. A whole milk powder comprising butter fat globules in substantially unbroken or normal condition, and coating around said globules formed of the colloidal constituents of the normal milk, such coating being capable of ready solution, on the addition of a requisite quantity of water, to produce a liquid substantially the same as normal milk, and on which the cream will rise as on such milk.

9. A whole milk powder comprising butter fat globules in substantially unbroken or normal condition, and coating around said globules in condition to emulsify when the powder is placed in water, such coating being capable of ready solution, on the addition of a requisite quantity of water, to produce a liquid substantially the same as normal milk and on which the cream will rise as on such milk.

10. A powder made from milk in which the butter fat particles are maintained in their normal condition being encysted or coated with a film of casein or other constituents of the milk, such casein or other constituents being capable of ready solution, on addition of a requisite quantity of water, to produce a liquid substantially the same as normal milk and on which the cream will rise as on such milk.

In witness whereof I have hereunto set my hand this 27th day of January, 1920.

SAMUEL M. DICK.